United States Patent
Mongodin et al.

[15] 3,645,127
[45] Feb. 29, 1972

[54] REMOTE LEAK DETECTION

[72] Inventors: Guy E. Mongodin, Huntington; Leon Malmed, Hicksville, both of N.Y.

[73] Assignee: Veeco Instruments, Plainview, N.Y.

[22] Filed: Jan. 12, 1970

[21] Appl. No.: 2,102

[52] U.S. Cl. ........................................................73/40.7
[51] Int. Cl. .......................................................G01m 3/20
[58] Field of Search....................................................73/40.7

[56] References Cited

UNITED STATES PATENTS 2,706,398   4/1955   Davidson...............................73/40.7
2,996,661   8/1961   Roberts..................................73/40.7

Primary Examiner—S. Clement Swisher
Attorney—Morgan, Finnegan, Durham and Pine

[57] ABSTRACT

In a method and apparatus for remote detection of leaks in vessels wherein the vessel to be tested is pressurized with a tracer gas and a hand probe connected via a flexible conduit to a mass spectrometer apparatus is used to selectively sample the atmosphere near the surface of the vessel, a continuous flow of a condensable carrier gas of a different molecular weight than the tracer gas is injected into the vacuum system near the probe tracer inlet to increase capillary conductance and thereby cut down on response time as well as to sweep the line clean of residual tracer gas molecules and thereby prevent background indications. The carrier gas is condensed at a cold trap in the conduit upstream of the analytical portion of the mass spectrometer apparatus and thereby pumped out of the system.

8 Claims, 3 Drawing Figures

REMOTE LEAK DETECTION

BACKGROUND AND SUMMARY OF THE INVENTION

This invention relates basically to methods and system apparatus for remote detection of leaks in vessels utilizing a tracer gas and mass spectrometer means for determining, quantitatively, the presence of such gas. More specifically, the invention relates to improvements in methods and apparatus utilizing a hand probe and interconnecting flexible tubulation wherein the response time, i.e., the time required from the moment of entry of the tracer gas molecules into the system for a response to occur in the mass spectrometer apparatus, can be controlled independently of the capillary length of the interconnecting tubulation.

The need for containment of a fluid dictates a corresponding need for leak test apparatus and procedures. Vacuum technology has played a major role in the development of the basic apparatus and procedures presently employed for leak detection.

One type of leak detection apparatus that has been developed employs, as its essential component, an analytical device called a mass spectrometer tube. This device requires a high-vacuum environment in order to function properly and is therefore normally associated with auxiliary vacuum components such as pumps, valves and traps.

The basic leak test procedure involves the utilization of a tracer gas, usually helium, with the object being the detection of the mass rate of passage, if any, of tracer molecule through the wall of the vessel under test.

In one form of the procedure, the vessel is connected directly to the leak detection apparatus and is evacuated of air and maintained in a low-pressure state by the vacuum source of the detection apparatus. The tracer gas is then introduced into the atmosphere immediately surrounding the vessel. Should a potential leak exist in the wall of the vessel, tracer gas molecules pass through at that point and are drawn by the vacuum source into the spectrometer tube where they are ionized and the ions counted as a measurement of the potential extent of the leak.

In a second form of the procedure, the vessel itself is pressurized with the tracer gas rather than evacuated. A hand probe called a "sniffer," which is essentially a sampling device having a variable inlet orifice, is connected to the high vacuum source mass spectrometer apparatus by a flexible tube serving as a vacuum conduit, and is employed to scan or probe the outer surface of the vessel wall, particularly at joints and welds where a leak is most likely to develop. The probe functions in conjunction with the flexible tubulation and vacuum source as a means for bringing the mass spectrometer apparatus into a proximal relationship with the potential source of the leak.

Should a source of leak exist, the escaping tracer gas molecules are picked up by the sniffer at its inlet orifice as the critical area is scanned. When the tracer molecules have reached and been analyzed by the spectrometer device after having passed through the sniffer and vacuum conduit, a reading occurs on the leak rate meter of the spectrometer tube indicating the number of tracer gas molecules and, hence, the potential size of the leak in the wall.

It can readily be appreciated that the length of time it takes for a reading to occur on the leak rate meter from the moment the molecules enter the sniffer inlet, i.e., the response time, is a highly important factor in the successful practice of this procedure. The shorter the time, the more accurate and effective the test.

Heretofore, the response time has been directly proportional to the capillary length of vacuum line employed, for the reason that the tracer molecules have to travel greater distances to reach the mass spectrometer apparatus with greater lengths of interconnecting tubulation. In a great many instances, the length of vacuum line connecting the sniffer to the spectrometer apparatus must be exceedingly long. In such instances, high-response times have heretofore been the rule with prior art methods and apparatus.

The disadvantages of such high-response times are manifold. The entire testing procedure must be slowed down since the operator must move the sniffer probe very slowly along the wall of the vessel if the source of the leak is to be accurately pin-pointed and measured. Inaccuracy and inefficiency are the result. It has been found that with the conventional prior art apparatus and techniques, no more than 3 or 4 yards of vacuum hose can be employed if the response time is to be kept within a practicable range of 2 to 3 seconds.

In addition to the above shortcoming of the prior art, a further problem is created by the tendency of the tracer gas molecules to become temporarily absorbed or embedded in the walls of the vacuum lines. This phenomenon, known as "tracer gas hand-up," causes background indications to occur in the leak meter readings. After each tracer gas indication on the leak rate meter, the indicator does not immediately return to its zero reading due to the retention of tracer gas molecules in the system. In the past, in order to obtain accurate indications, it was necessary to employ special time consuming clean up or degassing procedures after each leak indication.

It is an object of the instant invention to provide methods and apparatus permitting the utilization of relatively long vacuum lines for remote leak detection without losses or sensitivity, accuracy or efficiency.

It is another object of the invention to provide controls over response times so that the response in any given test procedure is substantially independent of the capillary length of interconnecting vacuum tubulation.

More particularly, it is an object of the instant invention to cut down on the response times of prior art leak test methods and apparatus by increasing the capillary conductance of the tubulation interconnecting the sniffer probe and the spectrometer apparatus.

The invention has as a further object the provision of methods and apparatus for continually sweeping the interconnecting vacuum tubulation to prevent tracer gas hang-up and thereby to eliminate the need for special degassing clean up procedures after each leak indication.

It is yet another object of the invention to provide methods and apparatus capable of attaining the foregoing objects and advantages without affecting pressure conditions in the mass spectrometer apparatus or otherwise affecting its functional operation.

Briefly and generally, the foregoing and other objects, features and advantages are accomplished in accordance with the instant invention by the injection of a continuous flow of a carrier gas of different molecular weight than the tracer gas into the vacuum system at a point in proximity to the tracer inlet of the sniffer probe. The carrier gas stream serves to increase the capillary conductance of the vacuum line and thereby to shorten response time, and also prevents tracer gas hang-up in the vacuum lines by continually sweeping the lines free of tracer gas molecules. After each leak indication, the leak rate meter immediately returns to its zero position without the need for clean up procedures.

It is essential in the practice of the invention in order to maintain proper vacuum environmental conditions for the spectrometer tube that the carrier medium be filtered or selectively pumped from the tracer gas line upstream of the spectrometer device. In a highly preferred embodiment of the invention a condensable gas such as $CO_2$, which can be conveniently filtered from the tracer gas molecules by condensation at a "cold trap" located upstream of the mass spectrometer tube, is employed as the carrier medium. As a result, the carrier gas concept can be employed without materially affecting pressure conditions within the spectrometer tube or otherwise impairing the sensitivity or accuracy of the device.

By injecting a continuous flow of carrier gas into the vacuum system immediately downstream from the inlet point of the tracer gas, a steady gas stream obeying the laws of gas dynamics immediately catches up and transports the otherwise random tracer gas molecules, should a leak exist, to the analytical portion of the mass spectrometer apparatus. The carrier gas increases the pressure in the vacuum system and changes the nature of the flow from molecular to viscous and thereby dramatically increases the capillary conductance of the vacuum system from the tracer inlet to the spectrometer device. In addition, the carrier gas stream has a continuous purging effect on the vacuum line by effectively sweeping the walls of the line clean of residual tracer gas molecules thereby eliminating background indications and the need for special degassing procedures.

It will thus be appreciated that response times can be effectively controlled substantially independently of the capillary length of the interconnecting tubulation simply by regulating the mass rate of flow of the carrier medium. By using a condensable gas as $CO_2$ as the carrier medium, the carrier gas stream can be removed from the tracer line by condensation at a cold trap, and significant decreases in response times without danger of adversely affecting the analytical operation of the spectrometer apparatus as thus achieved.

In accordance with a further aspect of the invention, special sniffer probe means having a concentric conduit arrangement is provided for injecting the carrier medium in continuous viscous flow into the system at a point near the sample inlet orifice. The probe is formed with a handle and an elongated barrel defining by means of a pair of concentrically arranged tubular members an outer annular passageway leading from the handle to the barrel tip where the sample inlet orifice is located and an inner passageway leading back from the inlet orifice through the barrel to the handle, the inner cylindrical member being of a length such as to define with the outer cylindrical member an annular opening near the tip connecting the outer annular passageway with the inner passageway. The carrier stream is introduced to the annular passageway of the barrel through the handle via an inlet valve formed therein.

By regulating the carrier valve, flow pressure conditions of the carrier stream can be closely regulated to thereby control capillary conductance and, hence, response time substantially independently of the capillary length of the vacuum tubulation. The atmospheric sample being drawn into the system by the vacuum source along with any tracer molecules that may have escaped through the wall of the vessel under test are immediately picked up by the viscous flow of the carrier stream due to the annular passageway construction of the barrel.

BRIEF DESCRIPTION OF THE DRAWINGS

Having summarized the invention, a detailed description follows with reference being had to the accompanying drawings forming a part of the specification, of which.

DETAILED DESCRIPTION OF THE INVENTION

Figure 1:
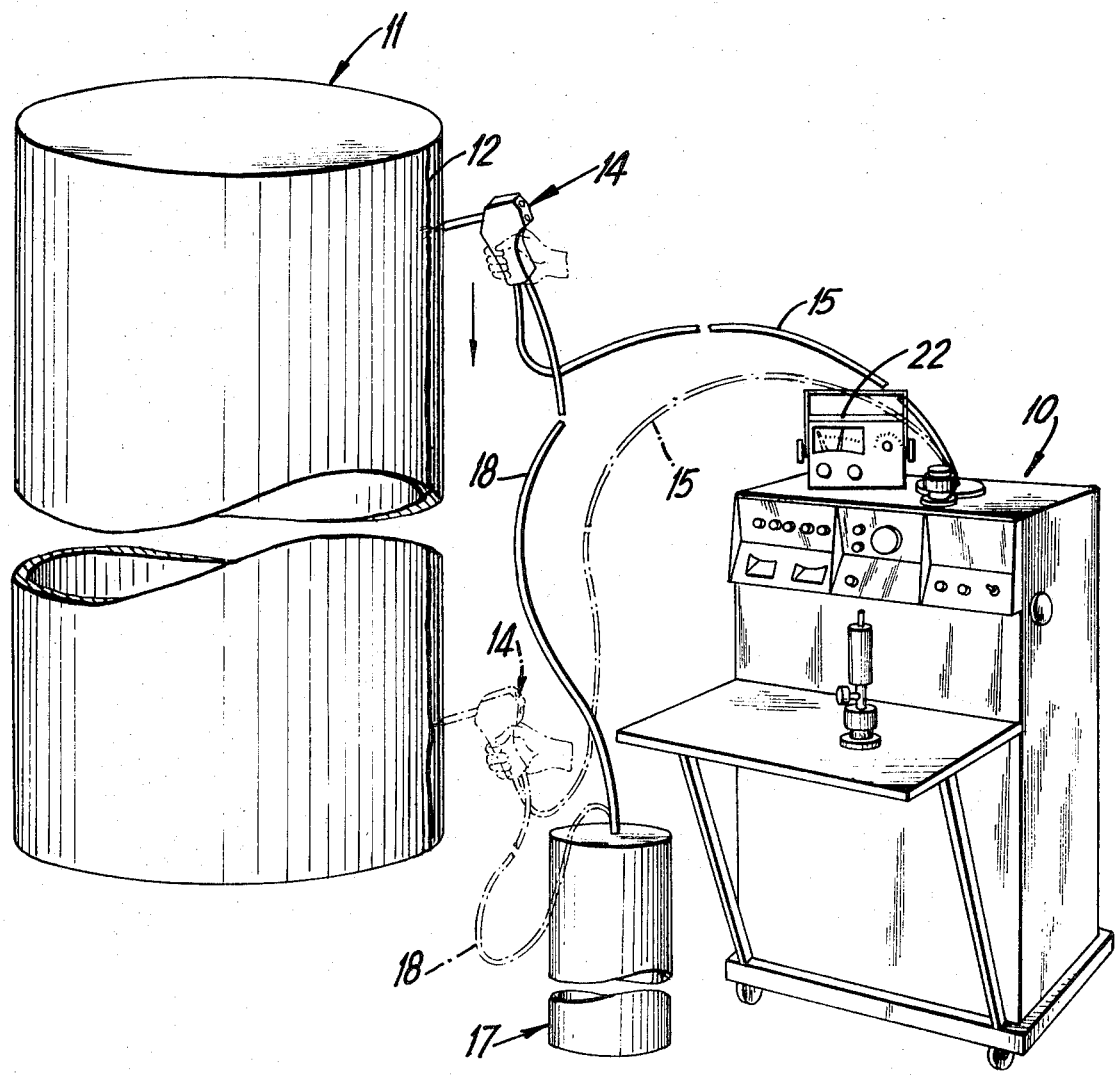
FIG. 1 is a perspective view of typical system apparatus embodying the instant invention being used in a typical leak-testing operation.

Turning now to the drawings and employing like reference characters to designate like parts throughout, a mass spectrometer leak detector 10 is illustrated in FIG. 1 in the performance of a leak test procedure on a vessel 11. Vessel 11 is illustratively formed with a weld seam 12, which is one of the regions where a leak is likely to occur, and is filled under pressure greater than 1 atmosphere, preferably 2 to 3 atmospheres, with a tracer gas 13. Helium is highly preferred as a tracer gas, although other known tracer mediums can be employed.

In FIG. 1, the weld seam 12 of the vessel 11 is being probed by a test operator (not shown) holding a sniffer probe 14. Probe 14 is connected to the leak detector apparatus 10 via a flexible tubulation 15.

In the practice of the invention, as in conventional systems, the probe is used to selectively sample the atmosphere at the outside surface of the vessel under test. Should any leak exist, the tracer gas molecules escaping through the leak opening are drawn into the probe and conducted via the tubulation 15 to the mass spectrometer apparatus for quantitative analysis.

In accordance with the instant invention, the sniffer probe 14 is connected, as well, to a source of a carrier medium 16, such as the illustrative vessel 17, via a second length of flexible tubing 18, as shown in FIG. 1. The probe is formed, as will more fully appear below, to inject a continuous flow of the carrier medium into the vacuum system at a point close to the tracer gas inlet of the system.

Figure 2:
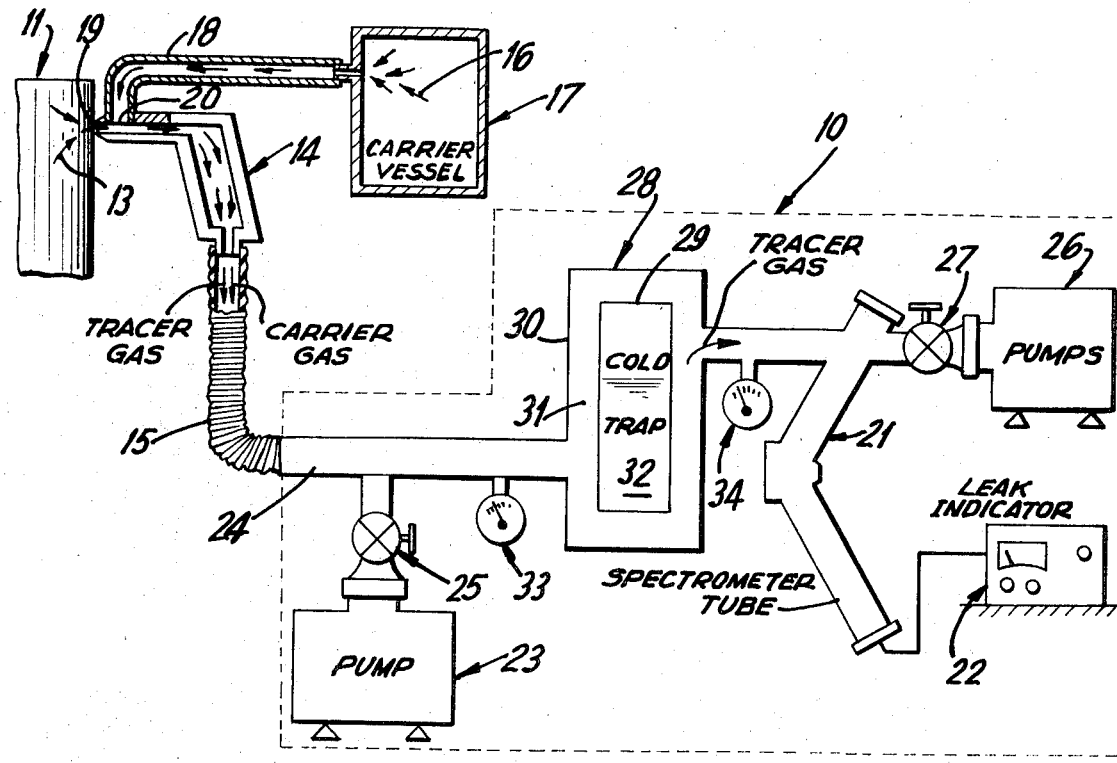
FIG. 2 is a diagrammatical schematic view of the system of FIG. 1.

Referring to FIG. 2, there is shown a diagrammatical illustration of the system apparatus embodying the instant invention in which is illustrated several of the basic components of the leak detector apparatus. As shown, the probe 14 has a sample inlet opening 19 at its probe tip through which the tracer gas molecules 13 are drawn into the system after passing through the wall of the vessel 11 at the point of leak. The random tracer gas molecules are immediately caught up and transported by the carrier stream 16 entering the probe near the tracer inlet 19 from the carrier vessel 17 via the diagrammatically illustrated tubulation 18 and the inlet opening 20. The carrier stream and tracer gas molecules are conducted in viscous flow via the conduit 15 into the leak detector apparatus 10.

The main functional elements of the leak detector are the mass spectrometer tube 21 and its associated leak rate indicator 22, with the other components of the system serving in an auxiliary capacity to provide a proper operating environment within the tube. Since the interior of the spectrometer tube must be maintained in a high-vacuum condition, a complete vacuum system consisting of pumps, valves and traps is provided.

Mass spectrometer leak detector units which have proven to be highly satisfactory in the successful practice of the invention herein are manufactured and sold by Veeco Instruments, Inc. of Terminal Drive, Plainview, New York, and are shown and described in the Veeco publication entitled "Mass Spectrometer Leak Test Models MS–12AB, MS–12AB–R, MS–12ABBQP, Operation & Maintenance Manual."

The basic components of the leak detector are shown in FIG. 2 and will now be briefly described to facilitate an understanding of the invention.

A mechanical roughing pump 23 is connected to the inlet manifold 24 of the detector apparatus via a normally closed roughing valve 25 for initially bringing the system down from atmospheric pressure to a pressure of less than one millitorr. Since the lowest pressure that can be normally attained by a mechanical pump such as the pump 23 is not low enough to produce the vacuum conditions required for the operation of the spectrometer tube 21, a second set of pumps indicated diagrammatically at 26 comprising a difusion pump and mechanical fore pump connected in series is employed to produce the high vacuum required. This second set of pumps 26 operates to exhaust the gas molecules from the spectrometer tube to the atmosphere. The difusion pump operating in series with the fore pump should be capable of reducing the system pressure to minus 6 millitorr or lower.

A second valve 27, which is normally completely open under ordinary leak test conditions as contradistinguished from roughing valve 25, is provided for selectively isolating the diffusion pump and fore pump from the rest of the vacuum system. Various vent valves (not shown) for placing different sections of the leak detector into communication with the atmosphere are provided.

Located on the upstream side of the spectrometer tube between the inlet manifold 24 and the tube is a cold trap 28. The conventional function of the cold trap in the vacuum system is to lower the temperature of residual vapors so that they no longer contribute significantly to the pressure in the system and thereby do not affect the function of the mass spectrometer tube. The cold trap provides highly refrigerated surfaces upon which the vapors condense and become trapped. The vapors most commonly encountered are oil vapor from the mechanical and difusion pumps.

The conventional cold trap is similar to a thermos bottle, as can be seen, there being an inner shell 29 and an outer shell 30 separated to an insulating vacuum 31. The inner shell is actually a container for a refrigerant 32 and is preferably designed so that all of its surface area remains within 2 percent of the refrigerant temperature even through the shell may be only partially filled. It is preferred that liquid nitrogen be employed as the refrigerant.

At various points throughout the operating cycle the pressure in different sections of the leak detector apparatus may be changing in different ways, In order to facilitate close operator control, vacuum gauges are advantageously placed at key locations in the system to provide continual visual indications of critical pressures. Two such gauges 33 and 34 are shown. Pressure gauge 33 is located in the inlet manifold 24 on the upstream side of the cold trap 28, and pressure gauge 34 is located between the trap and the spectrometer tube 21.

All of the foregoing components of the detector apparatus 10 along with others not shown herein are described in complete detail in the above referenced Veeco Instruments publication.

In accordance with the invention, the carrier medium 16 is a condensable gas, $CO_2$ being highly preferred. Employment of a condensable gas such as $CO_2$ permits the utilization of the carrier concept without increasing pressures in the mass spectrometer tube and is therefore an essential aspect of the vacuum system by condensation at the cold trap 28 upstream of the spectrometer tube after performing its function of transporting the tracer gas molecules from the sniffer probe inlet to the inlet manifold 22 of the spectrometer apparatus in a viscous flow. Hence, pollution of the spectrometer tube is avoided and the necessary high-vacuum conditions are maintained.

It is also essential that the carrier gas be of a different molecular weight than the tracer gas so that should any carrier gas escape condensation at the cold trap, its presence in the spectrometer tube will not affect the accuracy of the tracer indication appearing on the leak rate indicator 22. The mass spectrometer tube is selective in that it detects and counts the presence of molecules or discrete molecular weights.

Figure 3:
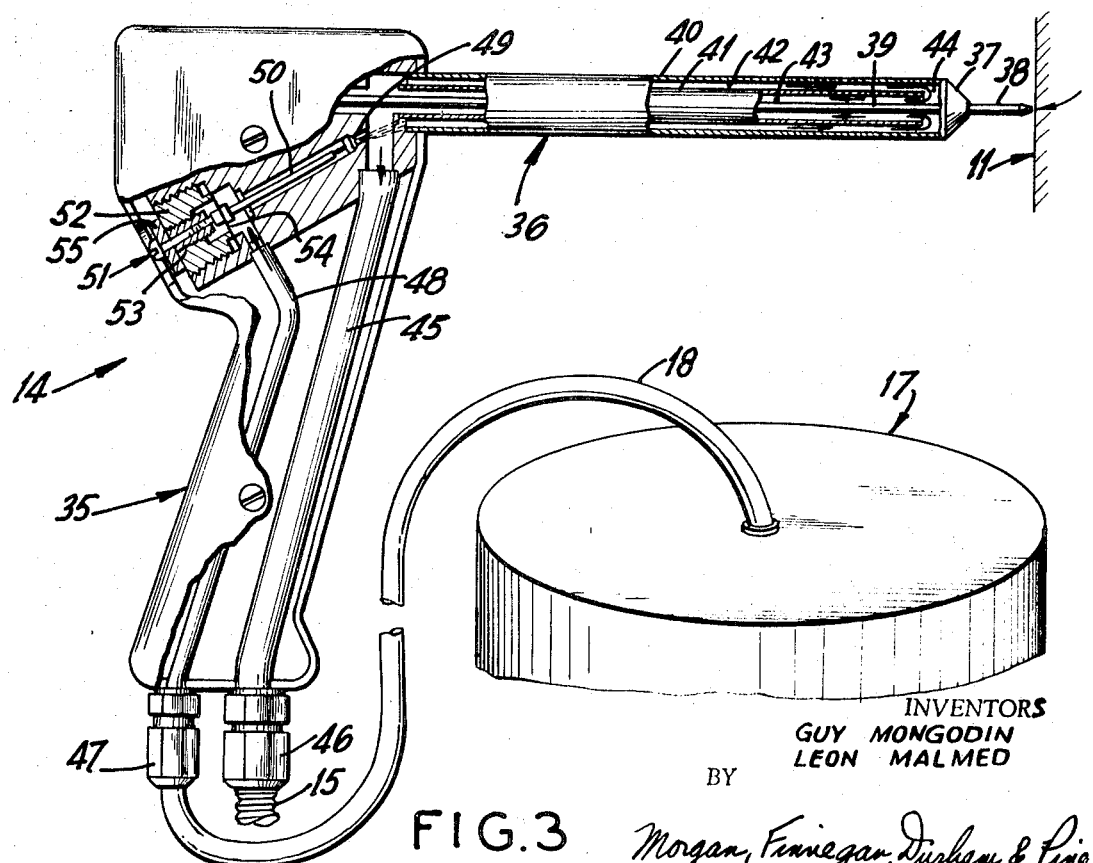
FIG. 3 is a partially sectional partially diagrammatical view of a preferred form of the "sniffer" probe embodying the instant invention.

Referring to FIG. 3 of the drawings there is illustrated a preferred embodiment, in accordance with the invention, of the sniffer probe 14 shown schematically in FIG. 2.

As shown therein, the sniffer is in the shape of a hand gun, having a pistol grip handle 35 and an elongated barrel, designated generally at 36, projecting therefrom. The handle and barrel are formed, in accordance with the invention, to define a series of interconnecting fluid passageways with the objective being the conductance in a viscous flow of a stream of carrier gas from the interconnecting carrier tubulation 18 through the handle 35 and the barrel 36 to a point in proximity to the tracer inlet at the tip, where the inflowing air sample is picked up along with any random tracer molecules, and thence back through the barrel and the handle to the interconnecting vacuum tubulation 15.

The barrel is illustratively substantially cylindrical in configuration except for a tapered extension 37 at its distal end defining a constricted tracer inlet passageway (not shown). A needle valve tip 38 secured to the barrel, preferably removably, defines a tracer inlet orifice (not shown) and a seat (not shown) for a needle rod 39 which, through translational axial movement controlled by any conventional fine adjustment mechanism (not shown), regulates the size of the aperture of the inlet orifice and hence the sensitivity of the instrument.

The interconnecting passageways of the barrel are defined by a pair of concentrically arranged tubular members, 40 and 41, the outer tubular member 40 defining the outer barrel configuration. It is to be observed that the inner tubular member 41 terminates somewhat short of the tapered extension 37 of the outer member for a reason which will shortly become clear.

The two concentrically arranged tubular members define an outer annular passageway 42 therebetween which serves as the carrier gas conduit of the barrel leading from the handle to the tip, while the inner member defines an inner main passageway 43 which serves as a conduit leading from the tip to the handle for the carrier stream and air sample including any tracer molecules that may be contained therein. The annular opening 44 defined by the terminal end of the inner tubular member and the tapered wall extension 37 of the outer tubular member serves as the connecting passageway between the outer annular carrier passageway 42 and the inner main passageway 43 of the barrel.

It is to be carefully noted that the annular passageway construction of the barrel with the shorter inner tubular member effectively serves to conduct the carrier gas stream to a point in proximity to the tracer inlet orifice of the system. This is a highly advantageous feature of the invention in that the tracer molecules will be immediately caught up in the viscous flow of the carrier stream to shorten the response time of the system.

The inner passageway 43 of the barrel communicates with the flexible vacuum line 15 leading to the spectrometer apparatus via a passageway 45 formed in the handle and a coupling member 46.

The annular passageway 42 of the barrel communicates with the flexible carrier gas line 18 via a second coupling member 47, a passageway 48 formed in the handle, and an adjustable needle valve comprising an orifice 49 and an adjustable needle rod 50.

The needle rod 50 is preferably controlled by a differential screw thread adjustment mechanism such as the one designated generally at 51. The differential screw mechanism shown for illustrative purposes in FIG. 3 includes an internally threaded tubular bushing 52 mounted in the probe handle and a shim 53 having internal and external threads of different pitches threaded through the bushing, with the needle rod being threaded through the shim. A diaphragm 54, preferably soldered to the rod to prevent the rod from rotating, prevents leakage. Rotation of the shim 53 in the bushing 42 by means of an external adjustment knob 55 causes axial translational displacement of the needle rod to thereby vary the aperture size of the orifice 49 in accordance with the differences of the pitches of the exterior and interior shim threads.

By this fine control mechanism, the mass rate of flow of the carrier stream through the barrel can be closely regulated. In this way, the flow pressures in the system are controllable to thereby control the response time independently of the capillary length tubulation the interconnecting vacuum tubulation 15.

Operation of the system will now be described. The flexible vacuum and carrier lines 15 and 18 are connected to the sniffer probe via the coupling members 46 and 47, respectively.

The vacuum system is then put in operation by opening the roughing valve 25 and closing the difusion and fore pump valve 27. The roughing pump 23 brings the pressure in the system down from atmospheric to a pressure of less than 1 millitorr. Thereafter, the roughing valve is closed and the difusion and fore pump valve 27 is opened enabling the latter sets of pumps 26 to bring the spectrometer tube down to an operating pressure somewhere between $1 \times 10^{-4}$ and $3 \times 10^{-4}$ torr. The pressure gauges 33 and 34 indicate to the operator the critical pressures in the system immediately before and after the cold trap 28, thus enabling him to determine if the carrier gas is effectively being pumped from the vacuum line by condensation and also enabling him to properly adjust the rate of carrier gas flow and the tracer inlet opening.

Before beginning the test, the apparatus must be calibrated by placing a known leak directly at the tip of the sniffer probe and adjusting the aperture size of the sample inlet orifice which controls the sensitivity of the apparatus.

The pressure indication at gauge 34 indicates the pressure of the atmospheric sample, as regulated by the sample inlet valve, which should be initially approximately $1 \times 10^{-4}$ torr., the lowest operating pressure of the spectrometer tube, in order to protect the device. The pressure can be adjusted up to $3 \times 10^{-4}$ torr which corresponds approximately to the upper pressure of the spectrometer operating range.

The pressure indicated by gauge 33 represents to a major extent the flow pressure of the carrier gas as regulated by the carrier inlet valve. This valve should be adjusted so that it is no higher than approximately $1 \times 10^{-1}$ torr., where commercial $CO_2$ is employed as the carrier medium. It is, of course, advantageous to adjust the flow to maximum pressure in order to lower the response time.

As a general rule, the rate of carrier gas flow will be varied in a direct relationship with the overall capillary length of the interconnecting vacuum line 15 employed.

After the leak rate indicator has been suitably calibrated, the operator moves the sniffer probe along the portions of the surface of the vessel under test that are most likely to develop leaks, such as welds and joints. The vacuum of the system is continuously drawing samples of the atmosphere from near the wall surface into the probe through the tracer inlet orifice at the tip 38 and thence in a viscous flow with the carrier stream through the inner passageway 43 of the barrel, the connecting passageway 45 of the handle, the capillary of the interconnecting vacuum line 15 and into the mass spectrometer apparatus.

Should any source of leak exist, molecules of the tracer gas contained under pressure within the vessel escape at that point in the vessel wall and are drawn into the sniffer at the tracer inlet orifice along with the outside air as the area of the leak is scanned. These molecules, which in the prior art systems would be conducted in a random molecular flow to the spectrometer apparatus, are immediately caught up and transported in a streamline viscous flow by the carrier stream to the inlet manifold of the spectrometer apparatus. The pressure in the inlet manifold 24, as indicated by pressure gauge 33, consists to a large extent of the pressure of the carrier gas. As the flow passes through the cold trap 28, the condensable carrier gas is condensed on the inner shell wall 29 of the trap and is collected therein for periodic removal. The tracer molecules continue to be drawn by the high-vacuum pumps 26 through the cold trap and the mass spectrometer tube where their presence is determined. The leak rate indicator 22 provides a positive reading, indicating the number of molecules present and, hence, the potential size of the leak.

After the positive reading appears on the leak indicator, the needle immediately returns to its zero position as soon as the probe is past the point of the leak, since the carrier stream is continuously purging the vacuum lines of the system to prevent tracer gas hang-up. After the probe is out of range of the leak, there are no residual tracer gas molecules in the system to create background indications.

It should be appreciated that the increased capillary conductance of the vacuum line 15 caused by the viscous carrier gas flow substantially reduces the response time of the system and thereby also increases the accuracy of the spectrometer apparatus in terms of locating the leak. In addition, the purging effect of the carrier stream serves to eliminate time-consuming clean up operations after each leak indication so that the system is immediately ready for use after a leak has been detected. Consequently, the operator can immediately move the probe back over the area that was just scanned to precisely pin-point the leak and accurately determine its size. Moreover, since no tracer gas molecules are hung up in the system, the leak indicator will provide a more accurate indication of the extent of the leak as determined by the rate of passage of tracer molecules through the vessel wall.

The apparatus and method of the instant invention presents a much greater percentage of the total tracer signal for a short exposure time than has heretofore been the case, thereby allowing not only more positive leak checking, but a more positive representative indication as to the relative size of the leak detected.

Practice of the invention has shown that under equal conditions, a visible tracer signal is obtained in less than half the time required by the conventional system. It has also been found that practice of the present invention with 30 feet of interconnecting vacuum tubing very nearly equals in performance the conventional system using only 6 inches of tubing.

In the practice of the invention, it is preferred that the pressure in the carrier vessel 17 and interconnecting carrier line 18 be at atmospheric and, more preferably, above. Under such pressure conditions, the existence of a leak in the interconnecting carrier line or coupling member will not result in an influx of outside contamination into the system. If the carrier connections were at a negative pressure with respect to the atmosphere, any such leak would create the possibility of outside uncondensable impurities being drawn into the system which might adversely affect the operation of the spectrometer apparatus.

What is claimed is:

1. Improved apparatus for detecting and locating leaks in vessels which have been pressurized with tracer gas of a selected molecular weight, said apparatus being characterized by short response times and the absence of background indications, comprising
   a. mass spectrometer means for quantitatively detecting and indicating the presence therein of molecules of said tracer gas, said mass spectrometer means having vacuum means for drawing selected atmospheric samples through said mass spectrometer means and for maintaining a suitable vacuum environment therein;
   b. flexible vacuum conduit means operatively connected to said mass spectrometer means for conducting said selected atmospheric samples thereto;
   c. a source of a continuous viscous flow of a carrier medium for increasing the capillary conductance of said vacuum conduit and preventing tracer gas hang-up therein, said supply source including flexible carrier conduit means;
   d. sniffer probe means operatively coupled to said flexible vacuum conduit means and said flexible carrier conduit means for probing the outer surface of the vessel under leak test, said sniffer means comprising sample inlet means for selectively sampling the atmosphere at the outer surface of said vessel for the presence of tracer gas molecules, and carrier inlet means in communication with said flexible carrier conduit means, said sniffer means further comprising a series of passageways leading from said carrier inlet means to said sample inlet means and then to said flexible vacuum conduit means for injecting a carrier medium stream into said vacuum system at a point in proximity to said sample inlet means so that any tracer gas molecules entering with said atmospheric samples will immediately be caught up by said carrier stream and conducted through said vacuum conduit to said spectrometer apparatus in a viscous flow; and
   e. carrier trap means associated with said mass spectrometer means on the upstream side thereof for removing said carrier medium from said vacuum system upstream of the analytical portion of said mass spectrometer means so that said carrier medium has no effect on the operating environment thereof.

2. Apparatus as defined in claim 1 wherein said carrier medium is a condensable gas and said carrier trap means comprises a cold trap for condensing said carrier gas.

3. Apparatus as defined in claim 2 wherein said carrier gas is of a different molecular weight than said tracer gas.

4. Apparatus as defined in claim 2 wherein said carrier gas is carbon dioxide.

5. Apparatus as defined in claim 2 wherein said carrier source is at a pressure no less than atmospheric.

6. Apparatus as defined in claim 2 further comprising first pressure gauge means for determining and indicating the fluid pressure in said system on the upstream side of said cold trap and second pressure gauge means for determining and indicating the fluid pressure in said system on the immediate downstream side of said cold trap upstream of the analytical portion of said mass spectrometer apparatus.

7. Apparatus as defined in claim 1 further comprising sample inlet adjustment means for controlling said sample inlet means to regulate the sensitivity of said apparatus, and carrier inlet adjustment means for controlling said carrier inlet means to regulate the flow pressure of said carrier medium and thereby the capillary conductance of said flexible vacuum conduit means.

8. In a leak detection method which includes pressurizing the vessel under leak test with a tracer gas of a selected molecular weight and employs mass spectrometer apparatus having a vacuum source connected via flexible tubulation to a hand probe for quantitatively analyzing samples of the atmosphere at the outside of the vessel wall for tracer gas molecules, an improvement for shortening response times and eliminating tracer gas hang-up in said tubulation which comprises increasing the capillary conductance of said interconnecting tubulation and simultaneously continuously purging said tubulation of tracer gas molecules by injecting into said vacuum system at a point in proximity to the sample inlet thereof a continuous viscous flow of a condensable carrier gas and thereafter condensing said carrier gas out of said system downstream of said interconnecting tubulation and upstream of the analytical portion of said mass spectrometer apparatus.

* * * * *